(12) United States Patent
Tanabe

(10) Patent No.: US 10,708,567 B2
(45) Date of Patent: Jul. 7, 2020

(54) DISPLAY CONTROL APPARATUS AND CONTROL METHOD THEREOF

(71) Applicant: CANON KABUSHIKI KAISHA, Tokyo (JP)

(72) Inventor: Akihiro Tanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/387,681

(22) Filed: Apr. 18, 2019

(65) Prior Publication Data

US 2019/0356893 A1 Nov. 21, 2019

(30) Foreign Application Priority Data

May 16, 2018 (JP) .................................. 2018-094760

(51) Int. Cl.
*H04N 9/87* (2006.01)
*H04N 5/77* (2006.01)
*H04N 9/68* (2006.01)
*H04N 5/232* (2006.01)

(52) U.S. Cl.
CPC ........... *H04N 9/87* (2013.01); *H04N 5/23293* (2013.01); *H04N 5/77* (2013.01); *H04N 9/68* (2013.01)

(58) Field of Classification Search
None
See application file for complete search history.

(56) References Cited

U.S. PATENT DOCUMENTS

| 10,116,908 | B2 | 10/2018 | Mochinaga et al. |
| 2016/0344990 | A1* | 11/2016 | Kozuka ............ H04N 21/43635 |
| 2017/0026627 | A1* | 1/2017 | Toma ........................ G09G 5/10 |
| 2017/0104973 | A1* | 4/2017 | Toma ........................ G06F 3/14 |
| 2019/0058855 | A1* | 2/2019 | Uchimura ............ G11B 27/326 |
| 2020/0053271 | A1* | 2/2020 | Aiba .................... H04N 5/2351 |

FOREIGN PATENT DOCUMENTS

| JP | 2015-005878 A | 1/2015 |
| JP | 2018-019122 A | 2/2018 |
| JP | 2018-023033 A | 2/2018 |

* cited by examiner

*Primary Examiner* — Samira Monshi
(74) *Attorney, Agent, or Firm* — Cowan, Liebowitz & Latman, P.C.

(57) ABSTRACT

An apparatus comprises an analyzer that analyzes a file, a convertor that converts dynamic range of image data, and a controller that outputs image data in the file to a display on the basis of the analysis, wherein the controller outputs a main image in the file to the display device if the display supports the dynamic range of the main image, outputs sub image to the display device if the display does not support the dynamic range of the main image and the sub image is included in the file, and uses the converter to convert the main image into image data having a dynamic range supported by the display to output the image data obtained through the conversion if the display does not support the dynamic range of the main image and the sub image is not included in the file.

8 Claims, 6 Drawing Sheets

FIG. 2A

| 'ftyp' | | | File Type Box |
|---|---|---|---|
| 'meta' | | | Metadata Box |
| | 'hdlr' | | Handler Box |
| | 'dinf' | | Data Information Box |
| | | 'dref' | Data Reference |
| | | 'url' | Data Entry URL Box |
| | 'pitm' | | Primary Item Box |
| | 'iinf' | | Item Information Box |
| | | 'infe' | ITEM INFORMATION ENTRY OF MAIN IMAGE |
| | | 'infe' | ITEM INFORMATION ENTRY OF SUB IMAGE |
| | | 'infe' | ITEM INFORMATION ENTRY OF MAIN IMAGE THUMBNAIL |
| | | 'infe' | ITEM INFORMATION ENTRY OF SUB IMAGE THUMBNAIL |
| | | 'infe' | ITEM INFORMATION ENTRY OF Exif METADATA (COMMON TO BOTH MAIN IMAGE AND SUB IMAGE) |
| | 'iref' | | Item Reference Box |
| | | 'thmb' | RELATIONSHIP BETWEEN MAIN IMAGE AND MAIN IMAGE THUMBNAIL |
| | | 'thmb' | RELATIONSHIP BETWEEN SUB IMAGE AND SUB IMAGE THUMBNAIL |
| | | 'cdsc' | RELATIONSHIP BETWEEN MAIN IMAGE AND METADATA |
| | | 'cdsc' | RELATIONSHIP BETWEEN SUB IMAGE AND METADATA |
| | 'iprp' | | Item Properties Box |
| | | 'ipco' | Item Property Container Box |
| | | | 'colr' | COLOR SPACE INFORMATION OF MAIN IMAGE |
| | | | 'hvcC' | Decoder Configuration Record OF MAIN IMAGE |
| | | | 'ispe' | SIZE INFORMATION OF MAIN IMAGE |
| | | | 'pixi' | PIXEL INFORMATION OF MAIN IMAGE |
| | | | 'irot' | MAIN IMAGE AND THUMBNAIL IMAGE ROTATION |
| | | | 'colr' | COLOR SPACE INFORMATION OF SUB IMAGE |
| | | | 'hvcC' | Decoder Configuration Record OF SUB IMAGE |
| | | | 'ispe' | SIZE INFORMATION OF SUB IMAGE |

FIG. 2B

| 'meta' | 'iprp' | 'ipco' | 'pixi' | PIXEL INFORMATION OF SUB IMAGE |
|---|---|---|---|---|
| | | | 'irot' | SUB IMAGE ROTATION |
| | | | 'colr' | COLOR SPACE INFORMATION OF MAIN IMAGE THUMBNAIL |
| | | | 'hvcC' | Decoder Configuration Record OF MAIN IMAGE THUMBNAIL |
| | | | 'ispe' | SIZE INFORMATION OF MAIN IMAGE THUMBNAIL |
| | | | 'pixi' | PIXEL INFORMATION OF MAIN IMAGE THUMBNAIL |
| | | | 'colr' | COLOR SPACE INFORMATION OF SUB IMAGE THUMBNAIL |
| | | | 'hvcC' | Decoder Configuration Record OF SUB IMAGE THUMBNAIL |
| | | | 'ispe' | SIZE INFORMATION OF SUB IMAGE THUMBNAIL |
| | | | 'pixi' | PIXEL INFORMATION OF SUB IMAGE THUMBNAIL |
| | | 'ipma' | | Item Property Association |
| | | | | INDEX ARRANGEMENT OF MAIN IMAGE PROPERTY |
| | | | | INDEX ARRANGEMENT OF SUB IMAGE PROPERTY |
| | | | | INDEX ARRANGEMENT OF PROPERTY OF MAIN IMAGE THUMBNAIL |
| | | | | INDEX ARRANGEMENT OF SUB IMAGE THUMBNAIL PROPERTY |
| | 'iloc' | | | Item Location Box |
| | | | | LOCATION INFORMATION OF DATA (HEVC) OF MAIN IMAGE |
| | | | | LOCATION INFORMATION OF DATA (HEVC) OF SUB IMAGE |
| | | | | LOCATION INFORMATION OF DATA (HEVC) OF MAIN IMAGE THUMBNAIL |
| | | | | LOCATION INFORMATION OF DATA (HEVC) OF SUB IMAGE THUMBNAIL |
| | | | | LOCATION INFORMATION OF METADATA (Exiff DATA) |
| 'mdat' | | | | Media Data |
| | | | | METADATA (Exiff DATA) |
| | | | | DATA (HEVC) OF MAIN IMAGE THUMBNAIL |
| | | | | DATA (HEVC) OF SUB IMAGE THUMBNAIL |
| | | | | DATA (HEVC) OF MAIN IMAGE |
| | | | | DATA (HEVC) OF SUB IMAGE |

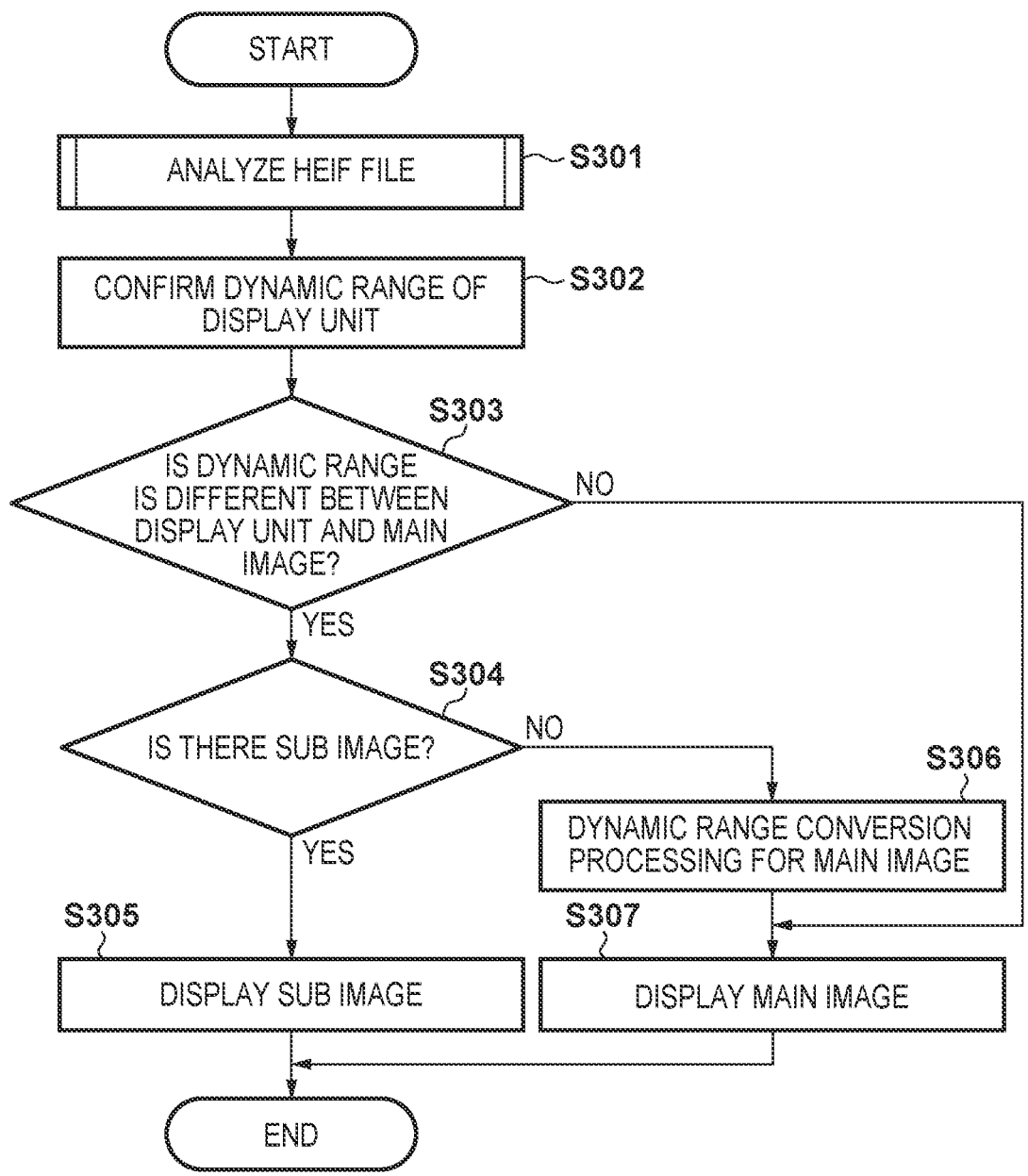

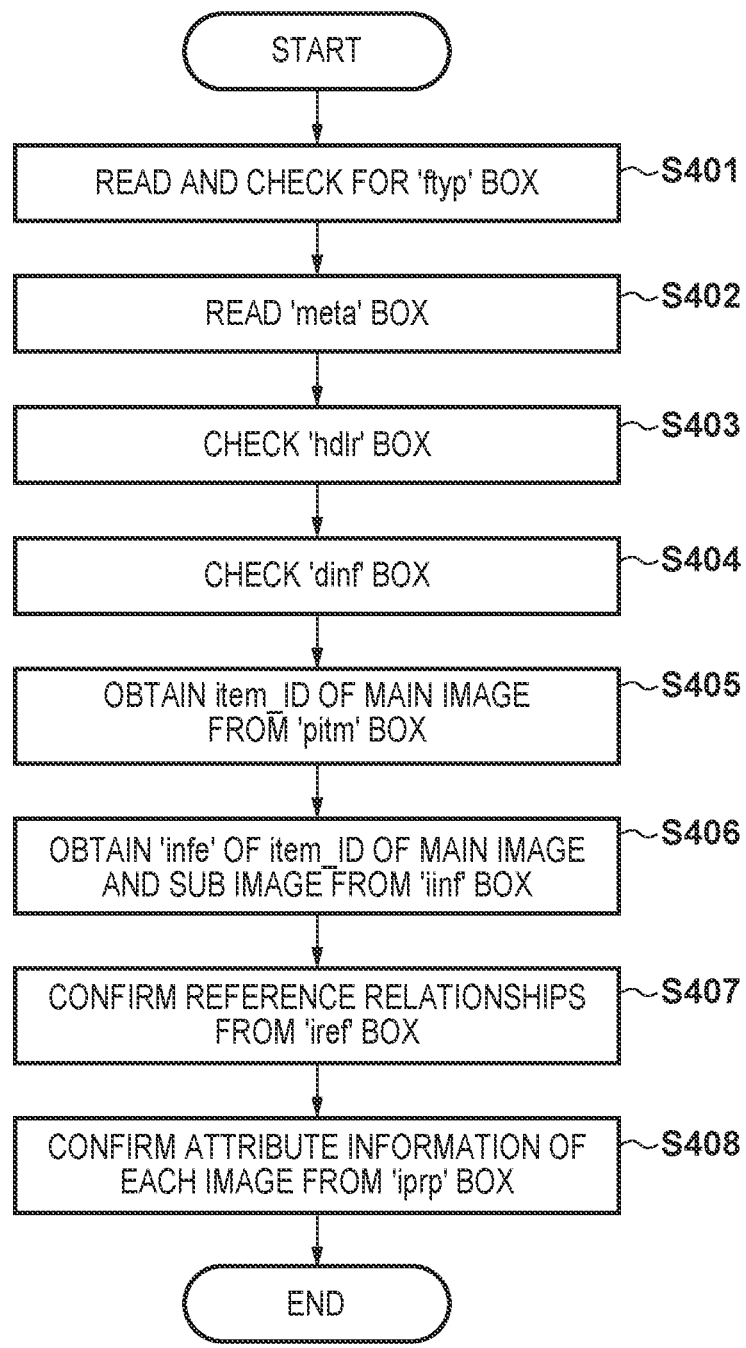

DISPLAY CONTROL APPARATUS AND CONTROL METHOD THEREOF

BACKGROUND OF THE INVENTION

Field of the Invention

The present invention relates to a display control apparatus and a control method thereof.

Description of the Related Art

Image capturing apparatuses, exemplified by digital cameras, compress and encode image data obtained by an image sensor, and then record the coded data in a recording medium as a file.

Up until now, before being compressed and encoded by the image capturing apparatus, image data has had what is known as Standard Dynamic Range (SDR), which has an upper limit brightness level of 100 nits. However, recent image capturing apparatuses capture images in High Dynamic Range (HDR), in which the upper limit of the brightness level has been expanded to approximately 10,000 nits, and record the images into recording media.

Japanese Patent Laid-Open No. 2015-5878 discloses a playback device that converts HDR image brightnesses into SDR image brightnesses when displaying HDR images in a display device that does not support HDR.

The aforementioned document discloses converting the dynamic range of an HDR image into the dynamic range of an SDR image and displaying the resulting image in a display unit that does not support HDR. However, the process for converting the dynamic range will also be carried out when recording both an HDR image and an SDR image expressing the same subject, and thus the processing is inefficient.

SUMMARY OF THE INVENTION

Having been conceived in light of the foregoing problems, the present invention provides a technique that efficiently displays and outputs image data contained in an image file for display, in accordance with the dynamic range of a display device.

According to an aspect of the present invention, there is provided a display control apparatus that causes an image based on an image file stored in a recording medium to be displayed in a display device, the apparatus comprising: at least one processor that functions as: an analysis unit that analyzes the image file to be displayed to determine image data of a main image included in the image file and furthermore determine whether or not image data of a sub image having a dynamic range different from the dynamic range of the main image is included in the image file; a conversion unit that converts the dynamic range of the image data; and a control unit that outputs the image data included in the image file to the display device on the basis of a result of the analysis carried out by the analysis unit, wherein the control unit: outputs the image data of the main image to the display device in the case where the display device supports the dynamic range of the main image in the image file; outputs the image data of the sub image to the display device in the case where the display device does not support the dynamic range of the main image in the image file and the image data of the sub image is included in the image file; and uses the conversion unit to convert the image data of the main image into image data having a dynamic range supported by the display device, and outputs the image data obtained through the conversion to the display device, in the case where the display device does not support the dynamic range of the main image in the image file and the image data of the sub image is not included in the image file.

According to the present invention, image data contained in an image file for display can be efficiently displayed and output in accordance with the dynamic range of a display device.

Further features of the present invention will become apparent from the following description of exemplary embodiments with reference to the attached drawings.

BRIEF DESCRIPTION OF THE DRAWINGS

FIGS. 2A and 2B are diagrams illustrating an HEIF structure according to an embodiment.

FIG. 3 is a flowchart illustrating an HEIF playback and display process according to an embodiment.

FIG. 4 is a flowchart illustrating an HEIF file analysis process according to an embodiment.

DESCRIPTION OF THE EMBODIMENTS

Figure 1:
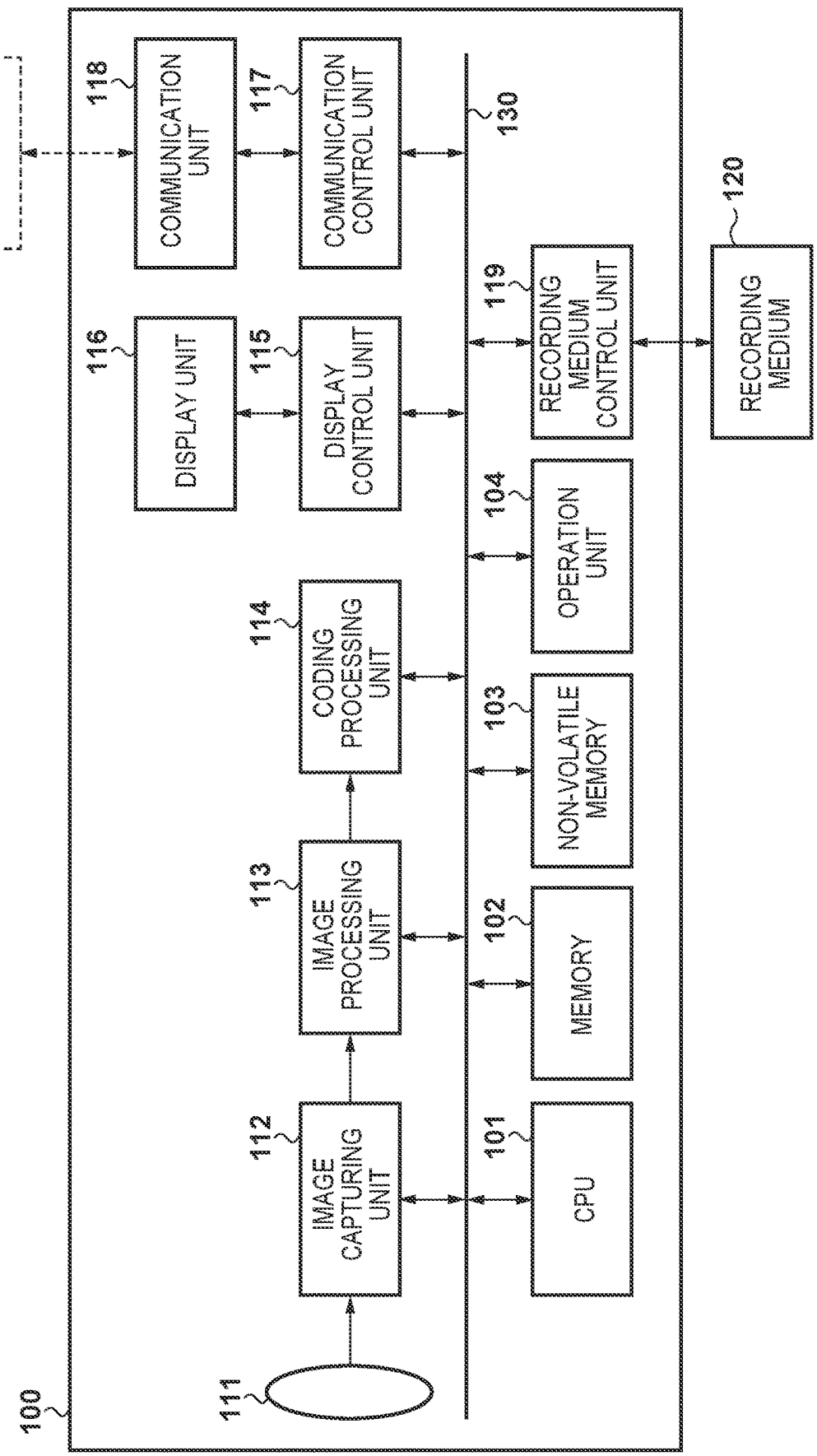
FIG. 1 is a block diagram illustrating the configuration of an image capturing apparatus according to an embodiment.

Hereinafter, embodiments of the present invention will be described in detail with reference to the appended drawings. It should be noted that the configurations described in the following first and second embodiments are merely examples, and that the present invention is not intended to be limited to the configurations described therein and illustrated in the drawings.

First Embodiment

Configuration of Image Capturing Apparatus

FIG. 1 is a block diagram illustrating the configuration of an image capturing apparatus 100 according to an embodiment. The image capturing apparatus 100 includes a CPU 101, memory 102, non-volatile memory 103, an operation unit 104, an image capturing unit 112, an image processing unit 113, a coding processing unit 114, a display control unit 115, and a display unit 116. The image capturing apparatus 100 further includes a communication control unit 117, a communication unit 118, a recording medium control unit 119, and an internal bus 130 that connects the processing units to each other. The image capturing apparatus 100 forms an optical image of a subject on a pixel array of the image capturing unit 112 using a lens unit 111, and the lens unit 111 may be fixed to the body (housing, main body) of the image capturing apparatus 100, or may be removable. The image capturing apparatus 100 writes and reads image data to and from a recording medium 120 via the recording medium control unit 119. The recording medium 120 may be removable from the image capturing apparatus 100, or may be built-in.

The CPU 101 controls the operations of the units (function blocks) of the image capturing apparatus 100 via the internal bus 130 by executing computer programs stored in the non-volatile memory 103.

The memory 102 is rewritable volatile memory. The memory 102 temporarily stores computer programs for controlling the operations of the units in the image capturing apparatus 100, information such as parameters pertaining to the operations of the units in the image capturing apparatus 100, information received by the communication control unit 117, and the like. The memory 102 also temporarily records images obtained by the image capturing unit 112, images and information processed by the image processing unit 113 and the coding processing unit 114, and the like. The memory 102 has a storage capacity sufficient to temporarily store such information.

The non-volatile memory 103 is electrically erasable and recordable memory, and for example, EEPROM, a hard disk, or the like is used. The non-volatile memory 103 stores computer programs for controlling operations of the units in the image capturing apparatus 100 and information such as parameters pertaining to the operations of the units in the image capturing apparatus 100. Various types of operations performed by the image capturing apparatus 100 are realized by these computer programs.

The operation unit 104 provides a user interface for operating the image capturing apparatus 100. The operation unit 104 includes various types of buttons such as a power button, a menu button, and a shooting button, and the various types of buttons are constituted by switches, a touch panel, and the like. The CPU 101 controls the image capturing apparatus 100 in accordance with user instructions input through the operation unit 104. Although a case where the CPU 101 controls the image capturing apparatus 100 on the basis of operations made through the operation unit 104 is described as an example here, the control is not limited to this format. For example, the CPU 101 may control the image capturing apparatus 100 on the basis of requests input from a remote controller (not shown), a mobile terminal (not shown), or the like via the communication unit 118.

The lens unit 111 is constituted by a lens group (not shown) including a zoom lens, a focus lens, and the like, a lens control unit (not shown), an aperture stop (not shown), and the like. The lens unit 111 can function as zoom means for changing the angle of view. The lens control unit adjusts the focus, controls the aperture value (F-stop value), and the like in response to control signals sent from the CPU 101. The image capturing unit 112 can function as obtainment means that sequentially obtain a plurality of images constituting a moving image. For example, an area image sensor such as a charge-coupled device (CCD), a complementary metal oxide semiconductor (CMOS) element, or the like is used as the image capturing unit 112. The image capturing unit 112 includes a pixel array (not shown), in which photoelectric conversion units (not shown) that convert an optical image of a subject into electrical signals are arranged in a matrix, i.e., two-dimensionally. The optical image of the subject is formed on the pixel array by the lens unit 111. The image capturing unit 112 outputs the captured image to the image processing unit 113 or the memory 102. Note that the image capturing unit 112 can also obtain a still image.

The image processing unit 113 carries out predetermined image processing on the image data output from the image capturing unit 112 or on image data read out from the memory 102. Dynamic range conversion processing, interpolation processing, reduction processing (resizing processing), color conversion processing, and the like can be given as examples of such image processing. The image processing unit 113 also carries out predetermined computational processing for exposure control, rangefinding control, and the like using the image data obtained by the image capturing unit 112. The CPU 101 carries out the exposure control, the rangefinding control, and the like on the basis of the computation results obtained from the computational processing by the image processing unit 113. Specifically, the CPU 101 carries out automatic exposure (AE) processing, auto white balance (AWB) processing, autofocus (AF) processing, and the like.

The coding processing unit 114 compresses the image data by subjecting the image data to intra-frame predictive coding (intra-screen predictive coding), inter-frame predictive coding (inter-screen predictive coding), and the like. The coding processing unit 114 is a coding device constituted by a semiconductor element or the like, for example. The coding processing unit 114 may be a coding device provided outside the image capturing apparatus 100. The coding processing unit 114 carries out the coding processing using a method such as H.265 (ITU H.265 or ISO/IEC23008-2), for example.

The display control unit 115 controls the display unit 116. The display unit 116 includes a display screen (not shown). The display control unit 115 generates an image that can be displayed in the display screen of the display unit 116, and outputs that image, i.e., an image signal, to the display unit 116. In addition to outputting the image data to the display unit 116, the display control unit 115 can also output the image data to an external device 217 via the communication control unit 117. The display unit 116 displays the image in the display screen on the basis of the image signal sent from the display control unit 115. The display unit 116 includes an on-screen display (OSD) function, which is a function for displaying a settings screen, such as a menu, in the display screen. The display control unit 115 can output the image signal to the display unit 116 with an OSD image superimposed on the image signal. The display unit 116 is constituted by a liquid crystal display, an organic EL display, or the like, and displays the image signal sent from the display control unit 115. The display unit 116 may be a touch panel, for example. If the display unit 116 is a touch panel, the display unit 116 can also function as the operation unit 104.

The communication control unit 117 is controlled by the CPU 101. The communication control unit 117 controls the communication unit 118 to send a video signal based on a communication standard such as High Definition Multimedia Interface (HDMI) (registered trademark), Serial Digital Interface (SDI), or the like. In addition to video signals, the communication control unit 117 can also send and receive control signals. The communication unit 118 converts the video signals and control signals into physical electrical signals and sends and receives those signals to and from the external device 217. Note that the configuration may be such that the communication control unit 117 generates a modulated signal conforming to a wireless communication standard such as IEEE 802.11 and outputs that modulated signal to the communication unit 118, and receives a modulated signal from the external device 217 via the communication unit 118. Although a case where the communication unit 118 wirelessly communicates video signals is described here as an example, these actions are not limited to being carried out by the communication unit 118.

The recording medium control unit 119 controls the recording medium 120. The recording medium control unit 119 outputs control signals for controlling the recording medium 120 to the recording medium 120 on the basis of requests from the CPU 101. For example, non-volatile memory, a magnetic disk, or the like is used as the recording medium 120. The recording medium 120 may be removable or may be built-in, as mentioned above. The recording medium 120 records encoded image data and the like. The image data and the like are saved as files in formats conforming to the file system of the recording medium 120. MP4 files (ISO/IEC 14496-14:2003), Material eXchange Format (MXF) files, and the like can be given as examples of the files. The function blocks 101 to 104, 112 to 115, 117, and 119 can access each other over the internal bus 130.

Normal operations of the image capturing apparatus 100 according to the embodiment will be described next.

In the image capturing apparatus 100, a startup instruction is supplied from the operation unit 104 to the CPU 101 upon a user operating the power button in the operation unit 104. In response to this instruction, the CPU 101 controls a power supply unit (not shown) to supply power to the various blocks of the image capturing apparatus 100. When power is supplied, the CPU 101 confirms which of a still image shooting mode, a playback mode, or the like, for example, a mode change switch of the operation unit 104 is set to, on the basis of an instruction signal from the operation unit 104.

In the normal still image shooting mode, the image capturing apparatus 100 carries out a shooting process in response to the user operating a still image recording button of the operation unit 104 while in a shooting standby state. In the shooting process, the image data of a still image captured by the image capturing unit 112 is subjected to image processing by the image processing unit 113 and coded by the coding processing unit 114, and the coded image data is then recorded in the recording medium 120 as an image file by the recording medium control unit 119. Note that in the shooting standby state, a live view image display is carried out by repeating the shooting of an image at a predetermined framerate by the image capturing unit 112, image processing for display in the image processing unit, and the display of the image in the display unit 116 under the control of the display control unit 115.

In the playback mode, the image file recorded in the recording medium 120 is read out by the recording medium control unit 119, and the image data of the read-out image file is decoded by the coding processing unit 114. The image processing unit 113 then carries out processing for display, and the image data is displayed in the display unit 116 under the control of the display control unit 115.

Although normal still image shooting and playback are carried out as described above, the image capturing apparatus according to the present embodiment has, in addition to the mode for normal still images, an HDR shooting mode for shooting an HDR still image, and can play back and display HDR still images that have been shot. In the shooting process according to the present embodiment, the dynamic range can be processed, and a file can be saved, by selecting one of Perceptual Quantization (PQ) HDR, Hybrid Log Gamma (HLG) HDR, and SDR, or a combination thereof at the same time.

A process for shooting and playing back an HDR still image will be described next.

File Structure

First, the file structure used when recording an HDR still image will be described.

A still image file format called the High Efficiency Image File Format (HEIF) has recently been developed (ISO/IEC 23008-12:2017). Compared to past still image file formats such as JPEG, HEIF has characteristics such as the following.

HEIF is a file format based on the ISO base media file format ("ISOBMFF" hereinafter) (ISO/IEC 14496-14: 2003).

Multiple still images can be stored, as opposed to a single still image.

Still images compressed in formats used to compress moving images, such as HEVC/H.265 and AVC/H.264, can be stored.

In the present embodiment, the above-described HEIF format is employed for recording HDR and SDR still image files. Accordingly, the data stored by HEIF will be described first.

HEIF manages the individual data that are stored in units called "items". In addition to the data itself, each item has an integer value item ID that is unique within the file (item_ID), and an item type expressing the type of the item (item_type). Items can be divided into image items, in which the data expresses an image, and metadata items, in which the data is metadata. Image items include coded image items, in which the data is coded image data, and derived image items, which express an image resulting from manipulating at least one other image item. An overlay image is an example of a derived image item. This is an image resulting from arranging a given number of image items at given locations. As an example of the metadata item, Exif data can be stored.

As described earlier, HEIF can store a plurality of image items. If the plurality of images are related, the relationships can be denoted as well. The relationship between a derived image item and the image items constituting the derived image item, the relationship between an actual image and its thumbnail image, and the like can be given as examples of relationships between multiple images. Relationships between image items and metadata items can also be denoted in the same manner.

The HEIF format is based on the ISOBMFF format. ISOBMFF will thus be described briefly first.

The ISOBMFF format manages data in a structure called "boxes". The "box" is a data structure that begins with a four-byte data length field and a four-byte data type field, which are then followed by data of a given length. The structure of the data part is determined by the data type. The ISOBMFF specifications, HEIF specifications, and so on define several data types and data part structures thereof. The box can also hold the data of another box. That is, boxes can be nested. Here, a box nested in the data part of a given box is called a "sub box". A box that is not a sub box is called a "file level box". Such a box is also a box that can be accessed sequentially from the start of the file.

A file in the HEIF format, when a plurality of still images are stored therein, will be described next using FIGS. 2A and 2B.

The file level box will be described first. A file type box having a data type of "ftyp" stores information pertaining to the compatibility of the file. According to ISOBMFF-compliant file specifications, the structure of the file defined by the specifications, the data stored in the file, and so on are declared by a four-byte code called a "brand", which is stored in the file type box. By disposing the file type box at the start of the file, the reader of the file can check the content of the file type box, and can therefore know the structure of the file without further reading out and interpreting the content of the file.

In the HEIF specification, the file structure is expressed by a brand of "mif1". If the coded image data that is stored is data compressed according to H.265, the brand is expressed by "heic" or "heix" in accordance with the H.265 compression profile.

A metadata box having a data type of "meta" contains a variety of sub boxes, and stores data pertaining to each item. The content thereof will be described in detail later.

A media data box having a data type of "mdat" stores data of each item. The data is, for example, coded image data of a coded image item, Exif data of a metadata item, and the like.

The sub boxes of the metadata box will be described next. A handler box having a data type of "hdlr" stores information expressing the type of the data managed by the metadata box. In the HEIF specifications, the handler type of the handler box is "pict". A data information box having a data type of "dinf" specifies the files in which the data of that file is present. In ISOBMFF, the data for a given file can be stored in files aside from the stated file. In this case, a data entry URL box denoting the URL of a file where the data is present is stored in a data reference within the data information box. If the desired data is present in the same file, a data entry URL box having only a flag expressing that the desired data is present in the same file is stored.

A primary item box having a data type of "pitm" stores the item ID of an image item expressing a main image. The main image can specify only a single image. An item information box having a data type of "iinf" is a box for storing the following item information entries.

An item information entry having a data type of "infe" stores the item ID, item type, a flag, and the like for each item. The item type is "hvc1" for an image item in which the coded image data is data compressed according to H.265. The item type is "Exif" for a metadata item in the Exif format. Meanwhile, if the least significant bit of a flag field is active in an image item, the image item is a hidden image. An item reference box having a data type of "iref" stores a reference relationship among items as a type of reference relationship, the item ID of the referring item, and the item ID of one or more referred items.

In the case of a thumbnail image, "thmb" is stored as the type of the reference relationship; the item ID of the thumbnail image, as the item ID of the referring item; and the item ID of the actual image, as the item ID of the referred item. In the case of a main image and a sub image, "cdsc" is stored as the type of the reference relationship; the item ID of EXIF metadata, as the item ID of the referring item; and the item ID of the main image or the sub image, as the item ID of the referred item.

An item properties box having a data type of "iprp" is a box for storing the item property container box and the item property association box described below.

The item property container box having a data type of "ipco" is a box that stores the boxes of individual property data. Each image item can hold the characteristics of that image and property data expressing attributes.

The property data boxes include the following. Decoder configuration and initialization data (type "hvcC" in the case of H.265) is data used to initialize the decoder. H.265 parameter set data (VideoParameterSet, SequenceParameterSet, and PictureParameterSet) is stored here.

Image spatial extents (type "ispe") indicates the size (width and height) of the image. If the main image and the sub image have the same image size, the same image spatial extents may be used for the main image and the sub image. Colour information (type "colr") is color space information of the image. The color information is constituted by the items "color_primaries", which defines the color space, "transfer_characteristics", which defines a transfer function, "matrix_cofficients", which indicates matrix coefficients, and "flags", which expresses whether or not the information is a full range. For example, if a PQ HDR image is saved as the main image, 9 is set for "color_primaries" (ITU-R BT.2020), 16 is set for "transfer_characteristics" (ITU-R BT.2100 PQ), and 9 is set for "matrix_cofficients" (ITU-R BT.2020). If an SDR image is saved as the sub image, a value suited to SDR is set. Image pixel information "pixi" indicates pixel information (a bit depth) of the image. If the main image is HDR, the bit depth is set to 10 bits, and if the sub image is SDR, the bit depth is set to 8 bits. Image rotation (type "irot") indicates a rotation direction when the image is displayed having been rotated. Although there are other properties in addition to those described above, they will not be mentioned here.

The item property association box having a data type of "ipma" stores the associations between each item and properties as the item ID and an index arrangement in the "ipco" of the associated properties.

An item data box having a data type of "idat" is a box storing item data having a small data size.

An item location box having a data type of "iloc" stores data location information of each item as an offset benchmark, an offset value from the offset benchmark, and a length. The offset benchmark is the start of the file or "idat".

Although there are other boxes in the metadata box, they will not be mentioned here.

Although FIGS. 2A and 2B illustrate structures constituted by two coded image items, namely a main image and a sub image, a plurality of sub images may be present, i.e., the number of coded image items is not limited to 2. As the number of sub images increases, so too do the following boxes and items.

The item information entries having a data type of "iinf" increase by the same number as there are sub images The item information entries having a data type of "infe" increase by the same number as there are sub images In the item property container box having a data type of "ipco", the property data boxes required by each sub image increase The item property association box having a data type of "ipma" increases by the same number as there are sub images The item location box having a data type of "iloc" increases by the same number as there are sub images If the sub images have a different dynamic range, e.g., if the dynamic range of the main image is PQ, the dynamic range of the first sub image may be SDR, and the dynamic range of the second sub image may be HLG.

Additionally, instead of a sub image, a thumbnail image that is smaller than the main image but larger than a normal thumbnail image may be defined and used. Furthermore, although the foregoing configuration assumes that the Exif data of the metadata item in the media data box having a data type of "mdat" is shared by the main image and the sub image, the Exif data of the metadata item may be saved separately for the main image and the sub image.

Although FIGS. 2A and 2B describe structures in which the main image and the sub image are not related, a relationship between the main image and the sub image may be defined by the item reference box "iref". For example, data types indicating the main image and the sub image are defined in the reference relationship types. The defined data types are assumed to include "from_item_ID", which indicates the referring item ID, "reference_count", which indicates the number of references, and "to_item_ID", which indicates the referred item ID. The item ID of the sub image is used as the "from_item_ID", and the ID of the main image is used as the "to_item_ID". This makes it possible to define the main image and the sub image as originating from the same original image (captured image).

HDR Image Playback

Processing by the CPU 101 of the image capturing apparatus 100, for playing back (displaying) an HDR image recorded in the recording medium 120 in HEIF format, will be described next. Although the present embodiment describes a case where the image is played back in the image capturing apparatus 100, the playback processing is the same for an information processing apparatus that does not have an image capturing unit, such as a personal computer, or an image processing device designed only for playback, and thus the processing is not limited to the image capturing apparatus 100. It should be understood that these descriptions are provided only to facilitate understanding of the processing. Note that it is assumed that the programs executed by the CPU 101 are stored in the non-volatile memory 103, and are read out to the memory 102 and executed.

Processing for selecting and playing back a main image and a sub image from an HEIF file, carried out by the CPU 101, will be described below with reference to the flowchart in FIG. 3. Although the processing described below pertains to a single HEIF file, if there are a plurality of HEIF files in the recording medium 120 and those files are to be played back, the processing is repeated in accordance with the number of files recorded or selected for playback by the user.

In step S301, the CPU 101 reads out the HEIF file to be played back into the memory 102 and carries out analysis processing. This analysis processing will be described in detail later. Once the analysis processing of step S301 ends, the CPU 101 moves the processing to step S302.

In step S302, the CPU 101 confirms whether the external device 217 is connected via the communication control unit 117. If the external device 217 is connected, the CPU 101 confirms whether or not the external device 217 supports HDR by receiving information corresponding to the color information "colr" in the item properties box "iprp" in a signal received from the communication control unit 117. For example, if HDMI (registered trademark) is used, the presence/absence of an HDR signal may be confirmed from Extended Display Identification Data (EDID) information, or may be confirmed from a CEC command. If the external device 217 is not connected, the CPU 101 reads out a setting value, stored in the non-volatile memory 103, indicating whether or not display of the display unit 116 is set to HDR. Once the process of step S302 ends, the CPU 101 moves the processing to step S303.

The foregoing processing is carried out in order to prioritize the external device 217 as the display device over the display unit 116 of the image capturing apparatus 100.

In step S303, the CPU 101 compares attribute information of the main image in the HEIF file obtained in step S301, and particularly the dynamic range attributes defined by the color information "colr", with the color information obtained in step S302. If the dynamic range of the display unit carrying out the display, i.e., the external device 217 or the display unit 116, is different (YES in S303), the CPU 101 moves the processing from step S303 to S304. However, if the dynamic range attributes of the HEIF file match the dynamic range of the display unit carrying out the display (NO in S303), the CPU 101 moves the processing from step S303 to S307.

In step S304, the CPU 101 determines whether or not a sub image is included in the HEIF file in question, on the basis of the result of the analysis processing carried out in step S301. If the CPU 101 has determined that a sub image is included in the HEIF file in question (YES in S304), the CPU 101 moves the processing from step S304 to step S305. If the CPU 101 has determined that a sub image is not included in the HEIF file in question (NO in S304), the CPU 101 moves the processing from step S304 to S306.

In step S305, the CPU 101 displays the SDR sub image, included within the HEIF file in question, in the external device 217 or the display unit 116, on the basis of the result of the analysis processing carried out in step S301. Specifically, the CPU 101 searches for an entry, having the item ID of the sub image, in the item location box within the metadata box of the HEIF file in question, and obtains the offset benchmark (construction_method), the offset, and the length. The CPU 101 then checks the offset benchmark. With the offset benchmark, a value of 0 indicates an offset from the start of the file, and a value of 1 indicates an offset within the item data box. If the offset benchmark is 0, the CPU 101 reads out, from the memory 102, a length equivalent to the number of bytes, starting from the location of the offset from the start of the file. If the offset benchmark is 1, the CPU 101 reads out, from the memory 102, a length equivalent to the number of bytes, starting from the location of the offset from the start of the data part of the item data box within the metadata box. The CPU 101 uses the coding processing unit 114 to decode the H.265 stream data read out from the memory 102, and saves the image data of the decoded sub image in the memory 102. The CPU 101 outputs the image data of the sub image by controlling the communication control unit 117 when displaying in the external device 217 and by controlling the display control unit 115 when displaying in the display unit 116. The CPU 101 ends the processing of this flowchart with the process of step S305.

On the other hand, if the processing has moved to step S306, the CPU 101 converts the dynamic range of the main image analyzed in step S301 so as to conform to the display device. The CPU 101 reads out the H.265 stream data of the main image from the memory 102 through the same processing as that of step S305. The CPU 101 uses the coding processing unit 114 to decode the H.265 stream data of the main image read out from the memory 102, and saves the image data of the decoded main image in the memory 102. The CPU 101 controls the image processing unit 113 to convert the HDR image to an SDR image through a dynamic range conversion process, and saves the converted image data in the memory 102. Once the process of step S306 ends, the CPU 101 moves the processing to step S307.

In step S307, the CPU 101 displays the main image analyzed in step S301 in the external device 217 or the display unit 116. If the process of step S306 has not yet been executed, the CPU 101 reads out the H.265 stream data of the main image from the memory 102, decodes the data using the coding processing unit 114, and saves the image data of the main image in the memory 102, in the same manner as in step S306. The CPU 101 outputs the image data of the main image by controlling the communication control unit 117 when displaying in the external device 217 and by controlling the display control unit 115 when displaying in the display unit 116. The CPU 101 ends the processing of this flowchart with the process of step S307.

The process of analyzing the HEIF file in the aforementioned step S301 will be described in detail next with reference to the flowchart in FIG. 4.

In step S401, the CPU 101 reads out the starting part of a specified file in the recording medium 120 to the memory 102, using the recording medium control unit 119. The CPU 101 then checks whether a file type box having the correct structure is present in the starting part of the read-out file, and furthermore, whether "mif1", indicating HEIF, is present in the brand therein. If a brand corresponding to a proprietary file structure is recorded, the CPU 101 checks whether that brand is present. As long as the brand guarantees a specific file structure, this brand check can make it possible to omit several subsequent structure checks, e.g., step S403 and step S404. Once the process of step S401 ends, the CPU 101 moves the processing to step S402.

In step S402, the CPU 101 reads out the metadata box "meta", of the specified file from the recording medium 120, to the memory 102. Once the process of step S402 ends, the CPU 101 moves the processing to step S403.

In step S403, the CPU 101 searches out, and checks the structure of, the handler box "hdlr" from the metadata box "meta" read out in step S402. In the case of HEIF, the handler type must be "pict". Once the process of step S403 ends, the CPU 101 moves the processing to step S404.

In step S404, the CPU 101 searches out, and checks the structure of, the data information box "dinf" from the metadata box "meta" read out in step S402. In the present embodiment, it is assumed that the data is present within the same file, and thus the CPU 101 checks that a flag to that effect is present in the data entry URL box. Once the process of step S404 ends, the CPU 101 moves the processing to step S405.

In step S405, the CPU 101 searches out the primary item box "pitm" from the metadata box "meta" read out in step S402, and obtains the item ID of the main image. Once the process of step S405 ends, the CPU 101 moves the processing to step S406.

In step S406, the CPU 101 searches out the item information box "iinf" from the metadata box "meta" read out in step S402, and obtains the item information entry corresponding to the item ID of the main image obtained in step S405. Furthermore, the CPU 101 confirms the item ID of the sub image having an item type of "hvc1" or the thumbnail image, and of the Exif metadata having an item type of "Exif", aside from the main image. Once the process of step S406 ends, the CPU 101 moves the processing to step S407.

In step S407, the CPU 101 searches out the item reference box "iref" from the metadata box "meta" read out in step S402, and confirms the reference relationships among the items from the item ID of the item information box obtained in step S406. With the reference relationship type of "thmb", the CPU 101 determines that a from_item_ID corresponding to the ID of the main image is a thumbnail of the main image, and that a from_item_ID corresponding to a different ID is a thumbnail of the sub image. Additionally, with the reference relationship type of "cdsc", the CPU 101 determines that the item is not the main image, and if the item does not have a reference relationship with the main image, determines that the item is a sub image. Note that if a reference relationship associating the main image with the sub image is present in the item reference box "iref", the main image and the sub image are recognized from the reference relationship between the main image and the sub image. Once the process of step S407 ends, the CPU 101 moves the processing to step S408.

In step S408, the CPU 101 searches out the item properties box "iprp" from the metadata box "meta" read out in step S402, and obtains the property data of the images. The CPU 101 refers to the properties within the item properties box "ipco" associated with each item ID defined in the item property association box "ipma". The CPU 101 obtains the attribute information of the main image, the sub image, a main image thumbnail, and a sub image thumbnail. The CPU 101 can identify whether each image is PQ HDR, HLG HDR, or SDR from the color information "colr" of that image. The CPU 101 ends the processing of this flowchart with the process of step S408.

According to the present first embodiment as described thus far, the image data of either a main image or a sub image having a similar resolution as a main image but having a different dynamic range can be selected and output in accordance with the dynamic range of a display unit.

Although the embodiment describes an HEIF file as an example of an image file to be displayed, it should be noted that any file format capable of storing the image data of a main image and a sub image having different dynamic ranges within a single image file may be used, and thus the file format is not limited to HEIF.

Second Embodiment

A second embodiment will be described next. In the first embodiment, the HEIF file is analyzed, and an image having an appropriate dynamic range is selected and displayed. Then, if a sub image having a different dynamic range from the display unit and the main image is also present in the HEIF file, the dynamic range of the main image is converted and displayed. However, if, for example, a process for converting the dynamic range is carried out by an application on a PC, the process will depend on the performance of the PC, and it may therefore take some time before the image is displayed in the display unit. In the present second embodiment, a process is carried out for determining whether or not to convert the dynamic range of the main image in accordance with the computation performance of the device.

The configuration of the image capturing apparatus is the same as in the first embodiment. However, a processing unit pertaining to image capturing need not be provided, and the image processing unit 113 need not carry out the dynamic range conversion processing. Furthermore, the file structure is the same as the file recorded in the HEIF format described in the first embodiment.

Figure 5:
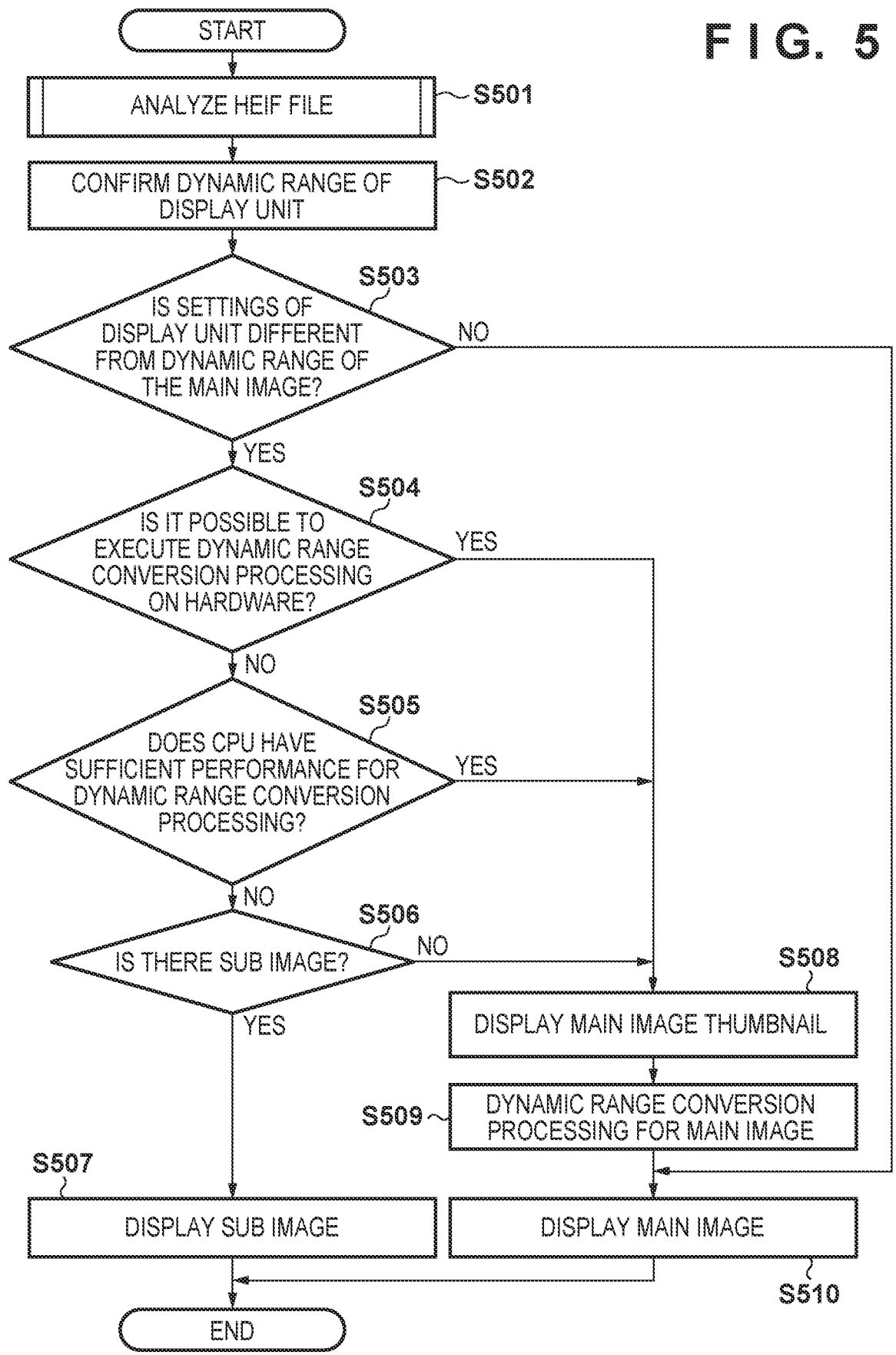
FIG. 5 is a flowchart illustrating an HEIF playback and display process according to a second embodiment.

A process for generating an HEIF file image according to the present second embodiment will be described next with reference to the flowchart in FIG. 5.

In step S501, the CPU 101 analyzes the HEIF file to be played back. This analysis processing is the same as step S301 according to the first embodiment, and thus descriptions thereof will be omitted. Once the process of step S501 ends, the CPU 101 moves the processing to step S502.

In step S502, the CPU 101 checks whether or not the external device 217 is connected, and confirms the dynamic ranges of the external device 217 and the display unit 116. This process is the same as the process of step S302 in the first embodiment. Once the process of step S502 ends, the CPU 101 moves the processing to step S503.

In step S503, the CPU 101 carries out the same process as that of step S303 in the first embodiment. If the dynamic range of the external device 217 or the display unit 116 is different from the main image being displayed (YES in S503), the CPU 101 moves the processing from step S503 to S504. If the dynamic range matches the dynamic range of the display unit carrying out the display (NO in S503), the CPU 101 moves the processing from step S503 to S509.

In step S504, the CPU 101 confirms whether or not hardware for carrying out the dynamic range conversion processing of the main image is present. For example, the CPU 101 determines whether or not the image processing unit 113 is capable of carrying out the dynamic range conversion processing. If the CPU 101 has determined that hardware for carrying out the dynamic range conversion processing is present (YES in S504), the CPU 101 moves the processing from step S504 to step S508. However, if the CPU 101 has determined that hardware for carrying out the dynamic range conversion processing is not present (NO in S504), the CPU 101 moves the processing from step S504 to step S505.

In step S505, the CPU 101 confirms whether or not the processing performance will be insufficient if the dynamic range conversion processing is carried out by the CPU 101 through software. For example, in the case of a PC, the computational processing performance per second may be measured in advance and compared to a threshold stored in the non-volatile memory 103, and if the performance is greater than or equal to the threshold, it may be determined that there is no problem with the performance. Note that the dynamic range conversion processing depends on the size (number of pixels) of the main image and the number of bits per pixel. As such, the threshold may be calculated by multiplying a coefficient, determined in accordance with the size of the main image and the number of bits per pixels, by a base threshold set in advance. If the performance is sufficient for carrying out the dynamic range conversion processing on the main image (YES in S505), the CPU 101 moves the processing from step S505 to S508. However, if the performance is insufficient for carrying out the dynamic range conversion processing on the main image (NO in S505), the CPU 101 moves the processing from step S505 to S506.

The process of step S506 is the same as that of step S304. If image data of a sub image is present in the HEIF file (YES in S506), the CPU 101 moves the processing from step S506 to S507. However, if image data of a sub image is not present in the HEIF file (NO in S506), the CPU 101 moves the processing from step S506 to S508.

The process of step S507 is the same as that of step S305. The CPU 101 ends the processing of this flowchart with the process of step S507.

In step S508, the CPU 101 displays a thumbnail of the main image analyzed in step S501 in the external device 217 or the display unit 116. As in step S506, the CPU 101 reads out the stream data of the thumbnail image of the main image from the memory 102, decodes the data using the coding processing unit 114, and saves the thumbnail image data of the main image in the memory 102. The CPU 101 outputs the thumbnail image data of the main image by controlling the communication control unit 117 when displaying in the external device 217 and by controlling the display control unit 115 when displaying in the display unit 116. Note that in this processing, the dynamic range conversion processing of step S509 (described later) may be carried out on the thumbnail image data of the main image. Once the process of step S508 ends, the CPU 101 moves the processing to step S509.

The process of step S509 is the same as that of step S306. Once the process of step S508 ends, the CPU 101 moves the processing to step S509.

The process of step S510 is the same as that of step S307. The CPU 101 ends the processing of this flowchart with the process of step S509.

By carrying out the processing of the present second embodiment as described thus far, a main image and a sub image having a similar resolution as a main image but having a different dynamic range can be selected and output in accordance with the display unit, having determined whether or not to carry out conversion in accordance with the dynamic range conversion processing performance of the image capturing apparatus 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-094760, filed May 16, 2018, which is hereby incorporated by reference herein in its entirety.

What is claimed is:

1. A display control apparatus that causes an image based on an image file stored in a recording medium to be displayed in a display device, the apparatus comprising:
at least one processor that functions as:
an analysis unit that analyzes the image file to be displayed to determine image data of a main image included in the image file and furthermore determine whether or not image data of a sub image having a dynamic range different from the dynamic range of the main image is included in the image file;
a conversion unit that converts the dynamic range of the image data; and
a control unit that outputs the image data included in the image file to the display device on the basis of a result of the analysis carried out by the analysis unit,
wherein the control unit:
outputs the image data of the main image to the display device in the case where the display device supports the dynamic range of the main image in the image file;
outputs the image data of the sub image to the display device in the case where the display device does not support the dynamic range of the main image in the image file and the image data of the sub image is included in the image file; and
uses the conversion unit to convert the image data of the main image into image data having a dynamic range supported by the display device, and outputs the image data obtained through the conversion to the display device, in the case where the display device does not support the dynamic range of the main image in the image file and the image data of the sub image is not included in the image file.

2. The apparatus according to claim 1, wherein the image file is a file in the High Efficiency Image File Format (HEIF).

3. The apparatus according to claim 1, wherein the control unit includes a determination unit that determines whether the conversion unit is implemented by hardware or by software, and in the case where the conversion unit is implemented by software, determines whether or not the processing performance of the processor is greater than or equal to a pre-set threshold; and in the case where the display device does not support the dynamic range of the main image in the image file, and a result of the determination by the determination unit indicates that the conversion unit can be implemented by hardware or that the conversion unit can be implemented through software by a processor having processing performance greater than or equal to the threshold, the control unit converts the image data of the main image into image data having a dynamic range supported by the display device using the conversion unit, and outputs the image data obtained through the conversion to the display device.

4. The apparatus according to claim 3, wherein in the case where the display device does not support the dynamic range of the main image in the image file, and a result of the determination by the determination unit indicates that the conversion unit can be implemented by hardware or that the conversion unit can be implemented through software by a processor having processing performance greater than or equal to the threshold, the control unit outputs thumbnail image data of the main image to the display device.

5. The apparatus according to claim 3, wherein the threshold is calculated by multiplying a base threshold by a coefficient determined by a number of pixels in the main image and a number of bits per pixel.

6. The apparatus according to claim 1, wherein, when instructions stored in the memory are executed by the processor, the display control apparatus further functions as:

a decoding unit that decodes coded image data of the main image and the sub image in the image file.

7. A method of controlling a display control apparatus, the apparatus causing an image based on an image file stored in a recording medium to be displayed in a display device, and the method comprising the steps of:

analyzing the image file to be displayed to determine image data of a main image included in the image file and furthermore determine whether or not image data of a sub image having a dynamic range different from the dynamic range of the main image is included in the image file;

converting the dynamic range of the image; and carrying out control for outputting the image data included in the image file to the display device on the basis of a result of the analysis carried out in the step of analyzing, wherein in the step of carrying out control:

the image data of the main image is output to the display device in the case where the display device supports the dynamic range of the main image in the image file;

the image data of the sub image is output to the display device in the case where the display device does not support the dynamic range of the main image in the image file and the image data of the sub image is included in the image file; and the step of converting is used to convert the image data of the main image into image data having a dynamic range supported by the display device, and the image data obtained through the conversion is output to the display device, in the case where the display device does not support the dynamic range of the main image in the image file and the image data of the sub image is not included in the image file.

8. A non-transitory computer-readable storage medium storing a program which, when read and executed by a computer, causes the computer to execute the steps of a method of controlling a display control apparatus, the method comprising the steps of:

analyzing an image file to be displayed to determine image data of a main image included in the image file and furthermore determine whether or not image data of a sub image having a dynamic range different from the dynamic range of the main image is included in the image file;

converting the dynamic range of the image; and carrying out control for outputting the image data included in the image file to the display device on the basis of a result of the analysis carried out in the step of analyzing, wherein in the step of carrying out control:

the image data of the main image is output to the display device in the case where the display device supports the dynamic range of the main image in the image file;

the image data of the sub image is output to the display device in the case where the display device does not support the dynamic range of the main image in the image file and the image data of the sub image is included in the image file; and the step of converting is used to convert the image data of the main image into image data having a dynamic range supported by the display device, and the image data obtained through the conversion is output to the display device, in the case where the display device does not support the dynamic range of the main image in the image file and the image data of the sub image is not included in the image file.

* * * * *